(12) United States Patent  
Brezina et al.

(10) Patent No.: US 6,987,932 B2  
(45) Date of Patent: Jan. 17, 2006

(54) APPARATUS AND METHOD FOR CONTROLLING AN OPTICAL TRANSCEIVER

(75) Inventors: Johnny R. Brezina, Austin, TX (US); Christopher M. Gabel, Rochester, MN (US); Brian M. Kerrigan, Austin, TX (US); Roger T. Lindquist, Dodge Center, MN (US); Gerald D. Malagrino, Jr., Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 814 days.

(21) Appl. No.: 10/007,024

(22) Filed: Nov. 5, 2001

(65) Prior Publication Data

US 2004/0208524 A1    Oct. 21, 2004

(51) Int. Cl.  
*H04B 10/00* (2006.01)
(52) U.S. Cl. .................. 398/137; 398/33; 398/195
(58) Field of Classification Search ............... 398/135, 398/136, 137, 138, 139, 122, 123, 129, 131, 398/156, 162, 33, 30, 31, 32, 195  
See application file for complete search history.

(56) References Cited

U.S. PATENT DOCUMENTS 5,684,614 A * 11/1997 Degura ...................... 398/131

6,658,214 B1 * 12/2003 Ito .............................. 398/120

OTHER PUBLICATIONS

U.S. Patent Application entitled "Optical Alignment in a Fiber Optic Transceiver", (Inventors Johnny R. Brezina, et al.).  
U.S. Patent Application entitled "Packaging Architecture for a Multiple Array Transceiver Using a Continuous Flexible Circuit", (Inventors Johnny R. Brezina, et al.).  
U.S. Patent Application entitled, "Mounting a Lens Array in a Fiber Optic Transceiver", (Inventors Johnny R. Brezina, et al.).

* cited by examiner

*Primary Examiner*—Christina Y Leung  
(74) *Attorney, Agent, or Firm*—Cardinal Law Group; Casimer K. Salys

(57) ABSTRACT

An optical transceiver is controlled through the use of a monitor optical signal generator and monitor optical signal detector mounted in close physical proximity to the optical signal generator and detector of the transceiver in a housing having a reflective surface. The monitor optical signal generator transmits a reference optical signal that is reflected and directed to the monitor optical signal detector by the reflective surface of the housing. Changes in the reference optical signal detected at the monitor optical signal detector are used for controlling the optical signal generator of the transceiver.

18 Claims, 1 Drawing Sheet

APPARATUS AND METHOD FOR CONTROLLING AN OPTICAL TRANSCEIVER

RELATED APPLICATIONS

This application claims priority to U.S. patent application Ser. No. 09/956,771 filed on Sep. 20, 2001 entitled "Fiber Optic Transceiver, Connector, And Method of Dissipating Heat" by Johnny R. Brezina, et al., the entire disclosure of which is incorporated by reference, herein.

This application relates to U.S. patent application Ser. No. 09/956,771 filed on Sep. 20, 2001 entitled "Fiber Optic Transceiver, Connector, And Method of Dissipating Heat" by Johnny R. Brezina, et al., the entire disclosure of which is incorporated by reference, herein.

This application also relates to the following applications, filed concurrently herewith:

"Optical Alignment In A Fiber Optic Transceiver", by Johnny R. Brezina, et al. U.S. patent application Ser. No. 10/007,027;

"External EMI Shield For Multiple Array Optoelectronic Devices", by Johnny R. Brezina, et al. U.S. patent application Ser. No. 10/006,644;

"Packaging Architecture For A Multiple Array Transceiver Using A Continuous Flexible Circuit", by Johnny R. Brezina, et al. U.S. patent application Ser. No. 10/007,026;

"Flexible Cable Stiffener for An Optical Transceiver", by Johnny R. Brezina, et al. U.S. patent application Ser. No. 10/007,028;

"Enhanced Folded Flexible Cable Packaging for Use in Optical Transceivers", by Johnny R. Brezina, et al. U.S. patent application Ser. No. 10/006,836;

"Internal EMI Shield for Multiple Array Optoelectronic Devices", by Johnny R. Brezina, et at. U.S. patent application Ser. No. 10/006,834;

"Multiple Array Optoelectronic Connector with Integrated Latch", by Johnny R. Brezina, et al. U.S. patent application Ser. No. 10/007,023;

"Mounting a Lens Array in a Fiber Optic Transceiver", by Johnny R. Brezina, et al. U.S. patent application Ser. No. 10/006,837;

"Packaging Architecture for a Multiple Array Transceiver Using a Flexible Cable", by Johnny R Brezina, et al. U.S. patent application Ser. No. 10/006,835;

"Packaging Architecture for a Multiple Array Transceiver Using a Flexible Cable and Stiffener for Customer Attachment", by Johnny R. Brezina, et al. U.S. patent application Ser. No. 10/006,838;

"Packaging Architecture for a Multiple Array Transceiver Using a Winged Flexible Cable for Optimal Wiring", by Johnny R. Brezina, et al. U.S. patent application Ser. No. 10/006,839; and "Horizontal Carrier Assembly for Multiple Array Optoelectronic Devices", by Johnny R. Brezina, et al. U.S. patent application Ser. No. 10/007,215.

TECHNICAL FIELD OF THE INVENTION

This invention relates to optical transceivers.

BACKGROUND OF THE INVENTION

Signal communication in electronic equipment, such as computers and telephones, often utilizes a transceiver having an optical signal generator for generating an optical output signal that is transmitted through a fiber optic cable. The optical signal generator is typically either a laser, or a light emitting diode (LED), depending upon the intensity required in the optical output signal. The transceiver also typically includes an optical signal detector for receiving an input optical signal from a fiber optic cable.

Power output of the optical signal generator must be carefully monitored and controlled during operation of the transceiver, to ensure proper operation and long life of the transceiver. Factors such as changes in operating temperature of the generator, or changes in environmental temperature around the transceiver can cause generator and detector performance variations that could potentially lead to degraded performance and shortened life of the transceiver. Such transceivers are also small in physical size, making it difficult to incorporate monitoring devices into the transceiver What is needed, therefore, is an improved method and apparatus for controlling an optical transceiver.

SUMMARY OF THE INVENTION

Our invention provides improved control of an optical transceiver having an optical signal generator and detector through the use of a monitor optical signal generator and a monitor optical signal detector mounted in close physical proximity to the optical signal generator and detector of the transceiver. The monitor optical signal generator transmits a reference optical signal to the monitor optical signal detector. Changes in the reference optical signal detected at the monitor optical signal detector are used for controlling the output of the optical signal generator of the transceiver.

In one form of our invention, an apparatus is provided for controlling an optical transceiver having an optical signal generator and a detector. The apparatus includes an output lens for transmitting an optical output signal from the generator; and an input lens for receiving and directing an optical input signal at the detector. The apparatus also includes a monitor optical signal generator for generating a reference optical signal, and a monitor optical signal detector for receiving the reference optical signal. The apparatus further includes a lens housing for mounting the output lens to transmit optical output signals, and for mounting the input lens to receive optical input signals. The lens housing includes a reflective surface adapted for receiving the reference signal from the monitor optical signal generator and for directing the reference signal to the monitor optical signal detector.

The reference optical signal may be substantially identical to the optical output signal. The apparatus may also include a controller adapted for receiving a monitoring signal from the monitor optical signal detector indicative of the reference optical signal, and for controlling the optical output signal of the optical signal generator in response to the monitoring signal.

The optical signal generator, monitor optical signal generator, monitor optical signal detector, and optical signal detector may be disposed in that sequential order in a planar array.

The reflective surface may be flat, faceted, or curved, and may include a first and a second reflective segment thereof, with the first reflective segment adapted for receiving the reference signal from the monitor optical signal generator and directing the reference optical signal to the second reflective segment, and with the second reflective segment adapted for receiving the reference optical signal from the first reflective segment and directing the reference optical signal to the monitor optical signal detector.

The apparatus may be configured such that the optical output and input signals are directed through the lens housing substantially parallel to one another. The apparatus may be further configure such that the reference optical signal travels to and from the lens housing in substantially parallel fashion.

Our invention also provides a method for controlling an optical transceiver having an optical signal generator and an optical signal detector. The method includes providing a monitor optical signal generator for generating a reference optical signal, and a monitor optical signal detector for receiving the reference optical signal. An input lens is mounted in a lens housing having a reflective surface for receiving the reference optical signal from the monitor optical signal generator and directing the reference optical signal to the monitor optical signal detector.

An optical output signal is generated from the optical signal generator and directed through the output lens. An input optical input signal is received through the input lens and directed to the optical signal detector. A reference optical signal is generated with the monitor optical signal generator, received at the reflective surface of the lens housing, and directed to the monitor optical signal detector.

A method according to our invention may also include operating the monitor optical signal generator with a reference optical signal substantially identical to the optical output signal The method may also include comparing the reference optical signal to a standard reference and adjusting the output signal to achieve a desired reference optical signal, or adjusting the optical output signal as a function of the reference optical signal received at the monitor optical signal detector.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

DETAILED DESCRIPTION

Figure 1:
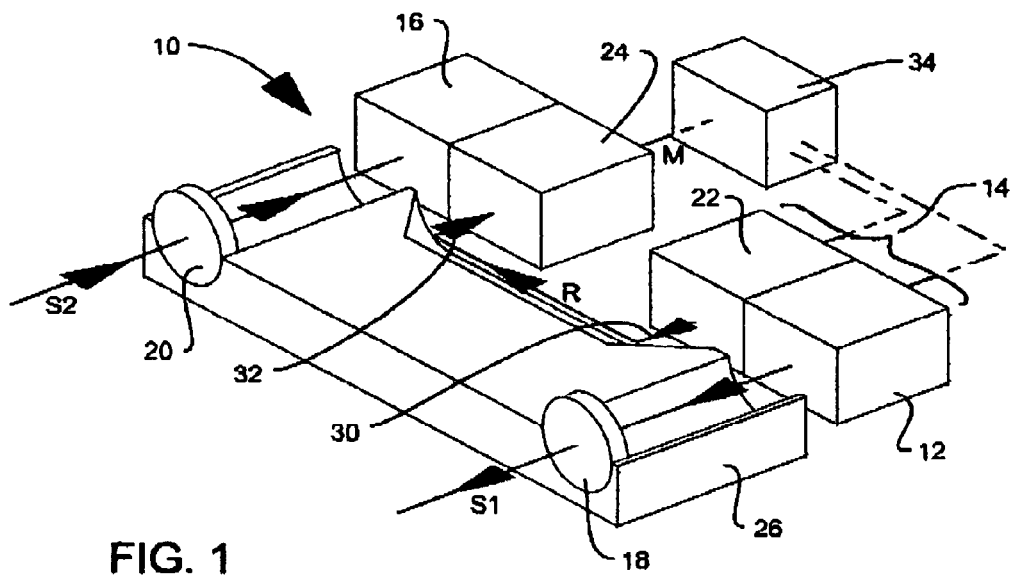
FIG. 1 is partial isometric cross section of an apparatus for controlling an optical transceiver, in accordance with our invention.
Figure 2:
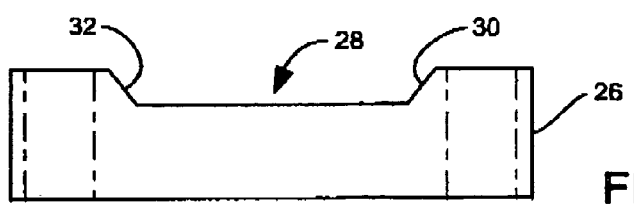
FIG. 2 is an orthographic plan view of a lens housing of the embodiment of our invention depicted in FIG. 1.
Figure 3:
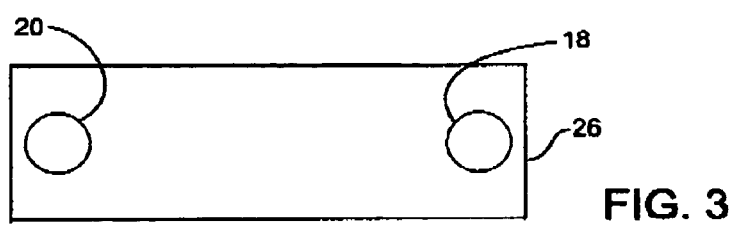
FIG. 3 is an orthographic elevation view of the lens housing of FIG. 2

FIGS. 1–3 depict an exemplary embodiment of an apparatus 10 for controlling an optical transceiver 14 having an optical signal generator 12, and an optical signal detector 16. The optical signal generator 12 generates an optical output signal S1 for delivery to an output optical cable (not shown). The optical signal detector 16 receives an optical input signal S2 from an input optical cable (not shown).

The monitoring apparatus 10 includes an output lens 18 adapted for receiving and directing the optical output signal S1, and an input lens 20 adapted for receiving and directing the optical input signal S2. The monitoring apparatus 10 also includes a monitor optical signal generator 22 for generating a reference optical signal R, and a monitor optical signal detector 24 for receiving the reference optical signal R.

The monitoring apparatus 10 further includes a lens housing 26 adapted for connection to the output and input optical cables. The lens housing 26 is also adapted for mounting the output lens 18 to receive the optical output signal S1 from the optical signal generator 12 and direct the optical output signal S1 at the output optical cable, and for mounting the input lens 20 to receive the optical input signal S2 from the input cable and direct the optical input signal S2 on the optical signal detector 16. The lens housing 26 further includes a reflective surface 28 adapted for receiving the reference optical signal R from the monitor optical signal generator 22 and for directing the reference optical signal R to the monitor optical signal detector 24.

The lens housing 26 and reflective surface 28 may be formed from a variety of materials. One preferred material combination is a lens housing 26 formed from highly glass filled polymer, with the reflective surface 28 being an opaque layer several angstroms thick of a metal such as aluminum or palladium, formed by sputtering or plating the opaque layer onto the housing 26.

In the exemplary embodiment of the apparatus 10 depicted in FIGS. 1–3, the optical signal generator 12, monitor optical signal generator 22, monitor optical signal detector 24, and optical signal detector 16 are disposed in that order in a planar array. The optical output and input signals S1, S2 are directed through the lens housing 26 in opposite directions substantially parallel to one another; and, the reflective surface 28 of the lens housing is configured such that the reference optical signal R is directed to and from the lens housing 26 along substantially parallel paths.

The reflective surface 28 is flat and faceted, and has a first reflective segment 30 thereof adapted for receiving the reference optical signal R from the monitor laser 22, and a second reflective segment 32 thereof for directing the reference optical signal R to the monitor optical signal detector 24. The first and second reflective segments 30, 32 of the reflective surface 28 are oriented 90 degrees to one another, and at an incidence angle of approximately 45 degrees to the reference optical signal R.

With the first and second reflective segments 30, 32 oriented in this manner, the reference optical signal R from the monitor optical signal generator 22 is reflected and turned 90 degrees by the first reflective segment 30, and reflected and turned 90 degrees a second time by the second reflective segment 32, such that the reference optical signal R is turned through a full 180 degrees in traveling from the monitor optical signal generator 22 to the monitor optical signal detector 24. Having the components of the apparatus 10 arranged and configured in this manner, provides a very compact and efficient assembly.

The apparatus 10 also includes a controller 34 adapted for receiving a monitoring signal M from the monitor optical signal detector 24, as indicated by dashed lines in FIG. 1. The monitoring signal M is indicative of the reference optical signal R received at the monitor optical signal detector 24, and is utilized by the controller 34 for controlling the optical output signal S1 of the laser 12 in response to the monitoring signal M. The controller 34 may also be used in a closed loop fashion to regulate both the optical output signal S1 from the optical signal generator 12, and the reference optical signal R from the monitor optical signal generator 22.

In some forms of our invention, the reference optical signal R may be substantially identical to the optical output signal S1. It is not necessary, however, that the reference optical signal R and the optical output signal S1 be identical. In some forms of our invention it may be desirable to utilize a reference optical signal R that differs from the optical output signal S1, and monitor changes in the reference optical signal R as indicators of changes in the optical output signal S1 caused factors such as changes in environmental temperature around the apparatus 10, or changes in temperature of the optical signal generator 12, during operation of the transceiver 14.

While the embodiments of our invention disclosed herein are presently considered to be preferred, various changes and modifications can be made without departing from the spirit and scope of the invention. For example, the optical signal generator 12, monitor optical signal generator 22, monitor optical signal detector 24, and optical signal detector 16 may be arranged in a configuration other than the planar array depicted in FIGS. 1–3.

The optical input and output signals S2, S1 need not be directed parallel to one another. The reference optical signal R need not travel from the monitor optical signal generator 22 and into the monitor optical signal detector 24 along parallel paths. The reflective surface 28 may have more or less than a first and a second reflective segment 30, 32, and the reflective segments may be oriented with respect to one another and incident to the reference signal R at angles different than depicted in FIGS. 1–3. For example, the reflective surface 28 may have only one reflective segment, and the monitor optical signal generator 22 and the monitor optical signal detector 24 may be oriented at angles of 45 degrees with respect to the reflective surface and 90 degrees with respect to one another, such that the reference optical signal R is reflected and turned 90 degrees in traveling between the monitor optical signal generator 22 and the monitor optical signal detector 24.

The optical signal generator 12 and the monitor optical signal generator 22 may either or both be a laser. The optical signal generator 12 and the monitor optical signal generator 22 may either or both be another form of optical signal generating device, such as a light emitting diode (LED). The transceiver 14 may also include more optical signal generators and detectors, and more monitoring optical signal generators and detectors than are depicted in FIGS. 1–3.

The scope of the invention is indicated in the appended claims. All changes or modifications within the meaning and range of equivalents are embraced by the claims.

We claim:

1. An apparatus for controlling an optical transceiver having an optical signal generator and a detector, the apparatus comprising:
   an output lens for transmitting an optical output signal from the generator;
   an input lens for receiving and directing an optical input signal at the detector;
   a monitor optical signal generator for generating a reference optical signal;
   a monitor optical signal detector for receiving the reference optical signal; and
   a lens housing for mounting the output lens to transmit optical output signals, and for mounting the input lens to receive optical input signals, the lens housing including a reflective surface adapted for receiving the reference signal from the monitor optical signal generator and for directing the reference signal to the monitor optical signal detector wherein the optical signal generator, monitor optical signal generator, and monitor optical signal detector are disposed in that order in a planar array.

2. The apparatus of claim 1 wherein the reference optical signal is substantially identical to the optical output signal.

3. The apparatus of claim 1 further including a controller adapted for receiving a monitoring signal from the monitor optical signal detector indicative of the reference optical signal, and for controlling the output optical signal of the generator in response to the monitoring signal.

4. The apparatus of claim 1 wherein the reflective surface includes a first and a second reflective segment thereof, with the first reflective segment adapted for receiving the reference optical signal from the monitor optical signal generator and directing the reference optical signal to the second reflective segment, and with the second reflective segment adapted for receiving the reference signal from the first reflective segment and directing the reference signal to the monitor optical signal detector.

5. The apparatus of claim 4 wherein the optical signal generator, monitor optical signal generator, monitor optical signal detector, and optical signal detector are disposed in that order in a planar array.

6. The apparatus of claim 4 wherein the optical output and input signals are directed through the lens housing substantially parallel to one another.

7. The apparatus of claim 4 wherein the reference optical signal travels to and from the lens housing in substantially parallel fashion.

8. The apparatus of claim 4 wherein:
   the optical signal generator, monitor optical signal generator, monitor optical signal detector, and the optical signal detector is disposed in that order in a planar array;
   the optical output and input signals are directed through the lens housing substantially parallel to one another; and
   the reference optical signal travels to and from the lens housing in substantially parallel fashion.

9. The apparatus of claim 1 wherein the lens housing encloses the monitor optical signal generator and the monitor optical signal detector, and wherein the reflective surface receives the reference signal within the lens housing and directs the reference signal to the monitor optical signal detector within the lens housing.

10. The apparatus of claim 1 wherein the reference signal is reflected and received within the lens housing.

11. The apparatus of claim 1 wherein the reference signal is reflected prior to transmission through the output lens.

12. An apparatus for controlling an optical transceiver having an optical signal generator and a detector, the apparatus comprising:
   an output lens for transmitting an optical output signal from the generator;
   an input lens for receiving and directing an optical input signal at the detector;
   a monitor optical signal generator for generating a reference optical signal;
   a monitor optical signal detector for receiving the reference optical signal; and
   a lens housing for mounting the output lens to transmit optical output signals, and for mounting the input lens to receive optical input signals, the lens housing including a reflective surface having a first reflective segment thereof adapted for receiving the reference optical signal from the monitor optical signal generator and a second reflective segment thereof for directing the reference optical signal to the monitor output signal detector;
   the optical output and input signals are directed through the lens housing substantially parallel to one another; and the reference optical signal travels to and from the lens housing in substantially parallel fashion wherein the optical signal generator, monitor optical signal generator, and monitor optical signal detector are disposed in that order in a planar array.

13. The apparatus of claim 12 wherein the lens housing encloses the monitor optical signal generator and the monitor optical signal detector, and wherein the reflective surface receives the reference signal within the lens housing and directs the reference signal to the monitor optical signal detector within the lens housing.

14. The apparatus of claim 12 wherein the reference signal is reflected and received within the lens housing.

15. A method for controlling an optical transceiver having an optical signal generator and an optical signal detector, the method comprising:
 providing a monitor optical signal generator for generating a reference optical signal, and a monitor optical signal detector for receiving the reference optical signal;
 mounting an input lens and an output lens in a lens housing having a reflective surface for receiving the reference optical signal from the monitor optical signal generator and directing the reference optical signal to the monitor optical signal detector;
 generating an optical output signal from the optical signal generator;
 directing the output optical signal through the output lens;
 receiving an optical input signal through the input lens;
 directing the optical input signal to the optical signal detector;
 generating a reference optical signal with the monitor optical signal generator;
 receiving the reference optical signal at the reflective surface of the lens housing; and
 directing the reference signal to the monitor optical signal detector wherein the optical signal generator, monitor optical signal generator, and monitor optical signal detector are disposed in that order in a planar array.

16. The method of claim 15 further including operating the monitor optical signal generator with a reference signal substantially identical to the output optical signal.

17. The method of claim 15 further including comparing the reference optical signal to a standard reference and adjusting the output optical signal to achieve a desired reference optical signal.

18. The method of claim 15 further including adjusting the output optical signal as a function of the reference optical signal received at the monitor optical signal detector.

* * * * *